(12) United States Patent
Raubenheimer et al.

(10) Patent No.: US 8,712,909 B1
(45) Date of Patent: Apr. 29, 2014

(54) SYSTEMS AND METHODS FOR MANAGING FLEET SERVICES

(75) Inventors: Peter D. Raubenheimer, San Antonio, TX (US); James Malcom Spears, San Antonio, TX (US); Crystal Jones Taylor, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 13/403,300

(22) Filed: Feb. 23, 2012

Related U.S. Application Data (60) Provisional application No. 61/445,949, filed on Feb. 23, 2011.

(51) Int. Cl.
*G06Q 40/00* (2012.01)
*G06Q 30/00* (2012.01)

(52) U.S. Cl.
USPC .............................................. 705/39; 705/26

(58) Field of Classification Search
USPC ...................................... 705/39, 26
See application file for complete search history.

(56) References Cited

U.S. PATENT DOCUMENTS

| 7,685,063 B2* | 3/2010 | Schuchardt et al. ............ 705/38 |
| 2002/0099618 A1* | 7/2002 | Stiberman ...................... 705/26 |

OTHER PUBLICATIONS

PR_Newswire; "AirIQ Named "Supplier of the Year/Specialty Products" by Thrifty car rental Franchisees"; Canda Newswire; May 14, 2002.*
Anonymous; "2004 Leasing software buyer's Guide"; ELT; May 2004.*

* cited by examiner

*Primary Examiner* — Edward Chang
(74) *Attorney, Agent, or Firm* — Edwards Wildman Palmer LLP (57) ABSTRACT

Systems and methods are described for managing fleet services. In an example, a vehicle selected from a plurality of vehicles presented in the user interface is received. A selected vehicle insurance for the vehicle is then received. A total cost for a lease of the vehicle and vehicle insurance associated with the selected vehicle insurance is determined. A lease of the vehicle and corresponding vehicle insurance is provided by the lessor. Other systems and methods are described.

7 Claims, 5 Drawing Sheets

SYSTEMS AND METHODS FOR MANAGING FLEET SERVICES

CLAIM OF PRIORITY

This patent application claims the benefit of priority, under 35 U.S.C. §119(e), to U.S. Provisional Patent Application Ser. No. 61/445,949, entitled "Systems and Methods for Managing Fleet Services," filed on Feb. 23, 2011, which is hereby incorporated by reference herein in its entirety.

FIELD

Various embodiments described herein relate generally to computer systems, and more particularly, but not by way of limitation, to systems and methods for managing fleet services.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Automobile purchases may be envisioned as having a lifecycle. For example, a buyer may first research potential purchases, then identify candidates, and finally arrive at a purchase decision. After purchase of the vehicle, other portions of the lifecycle develop, such as insurance, maintenance, and eventual disposal of the vehicle, such as by way of sale. During each phase, many decision points are available to the potential purchaser and eventual owner. There is a need to streamline the processes involved in a vehicle's lifecycle.

System Overview

One mechanism for streamlining the processes involved in a vehicle's lifecycle is to integrate vehicle acquisition services with other vehicle-related services, such as insurance, financial planning, vehicle maintenance, and vehicle disposal.

Figure 1:
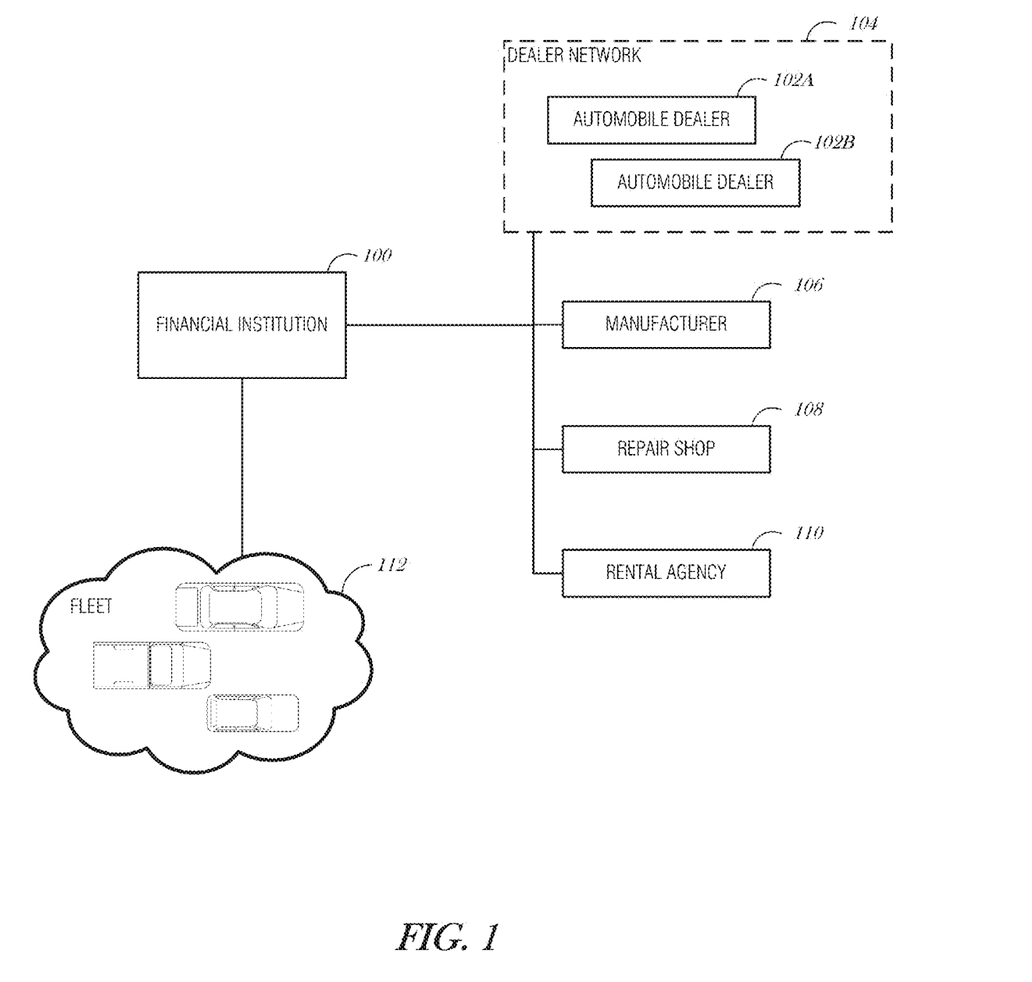
FIG. 1 is a schematic diagram illustrating a comprehensive financial institution according to various embodiments.

FIG. 1 is a schematic diagram illustrating a comprehensive financial institution and other items. FIG. 1 includes a comprehensive financial institution 100. In an embodiment, a comprehensive financial institution is one that offers several financial products or services. Examples of a comprehensive financial institution include institutions that offer fleet services and lending, ones that offer fleet services and insurance, or others that offer fleet services, banking, and insurance. Comprehensive financial institutions may have advantages of scale resulting in reduced costs to consumers, increased vehicle availability, or increased consumer convenience, for example.

The comprehensive financial institution 100 may have relationships with other business entities, such as one or more automobile dealers 102A, 102B in a dealer network 104. In addition, the comprehensive financial institution 100 may have relationships with a vehicle manufacturer 106, a vehicle repair shop 108, and a vehicle rental agency 110. It is understood that while the description discusses entities in the singular (e.g., "a vehicle manufacturer"), in some examples, the number may vary and represent multiple entities of the same or similar type (e.g., "several vehicle manufacturers"). Thus, the figures are meant to be illustrative and not restrictive.

The comprehensive financial institution 100 may also manage a fleet of vehicles 112 and offer fleet services to customers. Fleet services generally refer to systems and processes for managing a fleet of vehicles. Fleet services may be administered with the aid of software, known as fleet management software. Fleet management software is used to gather, store, monitor, and process data related to vehicles in the fleet. Fleet management software may be configured to interface with external data sources, such as onboard vehicle systems, fuel pumps, fuel stations, motor vehicle databases, repair stations, dealers, roadside transponders, parking meters, global positioning systems (GPS), and other devices. Fleet management software may also be configured to interface with internal data sources, such as customer databases, inventory databases, financial systems, insurance claims databases, and other operations databases.

In an embodiment, the comprehensive financial institution 100 leases vehicles from the fleet of vehicles 112. A lease has a lifecycle, which will be used as a framework for the next portion of this discussion. While the discussion uses the terms familiar to a lease, it is understood that rental agreements are encompassed by this disclosure.

Lease Origination

A lease generally refers to a contract between a lessee and a lessor. The lessor is the owner of the property and allows the lessee the right to use the property. The lease contract includes a term and a price. Most leases are for a fixed term, although indefinite leases are also considered within the scope of this disclosure. Indefinite leases include at-will leases, leases with a conditional duration, and leases with automatically renewable periods. Lease origination refers to the beginning of a lease term.

A person interested in obtaining a new vehicle may consider purchasing versus leasing. In an example, the person may be a member of, or associated with, a comprehensive financial institution 100, or other institution offering fleet services. The person may enter the lease process in one of several ways.

One way that the person may enter into a lease opportunity is with guidance from the comprehensive financial institution 100. In an embodiment, the comprehensive financial institution 100 includes a division for financial planning. The person may be a client of the financial planning division of the comprehensive financial institution 100. When the person experiences a life event, such as a birth of a child, the comprehensive financial institution 100 may be informed. For example, the person may contact the comprehensive financial institution 100 to establish a savings plan for the new child, adjust retirement plans, or draft a will. In response to the contact from the person, the comprehensive financial institution 100 may initiate an analysis of the person's situation and recommend acquiring, disposing, or otherwise modifying a vehicle for use by the person.

Another way that the person may enter into a lease opportunity is simply by contacting the comprehensive financial institution 100, or by being contacted by the comprehensive financial institution 100, such as by way of advertising and marketing. In an embodiment, the comprehensive financial institution 100 restricts leasing services to people who are existing members of the comprehensive financial institution 100, or those that qualify to be members. In another embodiment, the comprehensive financial institution 100 provides leasing services to the general public without regard to a membership with the comprehensive financial institution 100.

In an embodiment, the comprehensive financial institution 100 may refer the person to a vehicle dealer, such as automobile dealer 102A or 102B, in the dealer network 104, where the person may evaluate different vehicles and negotiate prices. In an embodiment, because of an existing relationship between the comprehensive financial institution 100 and the dealer network 104, the person may be provided with services, such as pre-negotiated prices, no-cost packages, or other attractive vehicle options.

In an embodiment, the dealer network 104 acts as a vehicle pool for the comprehensive financial institution's fleet of vehicles 112. A person who establishes a lease with the comprehensive financial institution 100 may be referred to an automobile dealer 102 where the person may receive the newly leased vehicle. When a lease expires or is otherwise terminated, the lessee may be instructed to return the off-lease vehicle to an automobile dealer 102. Automobile dealers 102 in the dealer network 104 may have agreements with the comprehensive financial institution 100 for these services. For example, when a person enters a lease with the comprehensive financial institution 100, the comprehensive financial institution 100 may purchase a vehicle from an automobile dealer 102 and instruct the person to receive the vehicle. After the lease is expired, when the person returns the vehicle to an automobile dealer 102, the comprehensive financial institution 100 may sell the vehicle to the automobile dealer 102 behind the scenes. In this way, the person leasing the vehicle is provided with conveniently located service and the comprehensive financial institution 100 owns the vehicles for the term of the lease, thereby simplifying the lessor-lessee relationship. In addition, agreements may be arranged between the comprehensive financial institution 100 and the automobile dealer 102 such that the purchase and later sale are at a mutually beneficial price.

In an embodiment, the person is provided an electronic forum to browse vehicles and corresponding offers. The electronic forum may be an online forum, such as a website or other network-accessible area. Dealers from the dealer network 104 may advertise within the electronic forum, such as by providing inventory, offers, and other information of products and services. In addition, the comprehensive financial institution 100 may provide information from vehicle manufacturers 106 to assist the person in making a purchasing or leasing decision.

Once the person has decided to lease a vehicle from the comprehensive financial institution 100, the person may be presented with various lease structures or pricing. One example lease structure is a fixed price model. A fixed price model may include a fixed price per payment period (e.g., monthly) for the term of a lease. The fixed price may be for one or more vehicle-related products in addition to the lease costs, such as insurance, maintenance, repairs, fuel costs, and the like. A lease using a fixed price structure provides for easier financial planning for both the comprehensive financial institution 100 and the lessee.

One or more elements of a fixed price package may be offered in various tiers. For example, insurance may be offered with a low-coverage tier, a medium-coverage tier, and a full-coverage tier. As another example, a maintenance plan may be offered in multiple tiers. Similarly, the lease vehicle may be associated with a tier.

In an embodiment, tiers are established based on a vehicle model and price range. For example, Tier 1 may be for "inexpensive sedans," Tier 2 may be for "moderately expensive sedans," and Tier 3 may be for "expensive sedans." Tier 1 may include vehicles such as the Ford® Fiesta®, the Hyundai® Elantra®, and the Toyota® Yaris®; Tier 2 may include vehicles such as the Hyundai® Sonata®, the Toyota® Camry®, and the Volkswagen® Jetta®; and Tier 3 may include vehicles such as the Mercedes-Benz® E-Class®, the Cadillac® DTS, and the Lexus® GS 350. The comprehensive financial institution 100 may offer a lease for any vehicle in a particular tier at a common price for that tier. For example, a buyer may choose between the Toyota® Camry® and the Volkswagen® Jetta®, with each having a total monthly cost of $225, which may include insurance, fuel, and maintenance.

Tiers may also be based on the type of vehicle, such as a high-efficiency vehicle, electric vehicle, or hybrid vehicle. A comprehensive financial institution 100 that offers a fleet of vehicles 112 for lease may provide specialty vehicles (e.g., electric vehicles) to areas that do not usually have such vehicles available in the local market. As an example, in Minnesota it is harder to find a rear-wheel driven sports sedan when there is an all-wheel option available. Manufacturers and dealers supply all-wheel vehicles to the northern regions with the understanding that people may prefer all-wheel drive, especially in the winter months. Those that want a rear-wheel drive vehicle may have to order one from the factory or go outside of the region to purchase one. With a fleet of vehicles 112 available, the buyer may be given more options and have access to vehicle that may be difficult to obtain normally.

Overall, the fixed price may be based on the selected tiers of each component in a package, the tiers being established by the comprehensive financial institution 100. For example, a person may select Tier 1 of vehicles, Tier 3 of maintenance, and Tier 2 of insurance, resulting in a calculated fixed price of $300 a month. Choosing other combinations of tiers would result in a different fixed monthly (or other periodic) price.

In an embodiment, the person is able to research lease options online. The person may be presented with a single-price option (e.g., fixed price) and be able to compare the single-price option with cost of each component. For example, a person may choose a single-price package for a midsize coupe in a moderately expensive category. The single-price package may include other products such as insurance and a maintenance contract (e.g., covering all repair and maintenance for the term of the lease). A user interface may be provided that breaks out the costs of each component (e.g., lease, insurance, and maintenance). The user interface may be further configured to display the cost of each product if purchased separately (e.g., a la carte). Further, the user interface may be configured to allow the user to choose which products to include and then provide a single price for the selected products.

In an embodiment, the comprehensive financial institution 100 may enable vehicle telematics at the origination of the lease. Telemetric data such as vehicle speed, travel distance, vehicle maintenance, fuel use, and other data is useful for various reasons including configuring insurance risks and costs, enabling the comprehensive financial institution 100 to provide maintenance recommendations and reminders, or inventory control. In an embodiment, the comprehensive financial institution 100 may offer a reduction in cost to the lessee, such as a lower insurance premium, in exchange for enabling the vehicle telematics. In another embodiment, because the lessor owns the vehicle, the lessor has the right to modify the vehicle to design. Thus, the lessor may enable vehicle telematics and inform potential lessees of the data being collected such that the lessee enters into the lease with full disclosure.

During the Lease

Several types of events may occur during a lease. Events may be related to the lessee, the lessor, or the vehicle. Events related to the lessee include various life events, such as the birth of a child, marriage, divorce, job loss, or receiving an inheritance. Each of these life events may have an impact on whether the lessee can continue an existing lease. In an embodiment, the comprehensive financial institution 100 may provide a lease that is reconfigurable during the lease term. For example, when a life event occurs, the lessee may be allowed to alter the vehicle tier of the lease.

As an illustrative example, a lessee Dave, who is married to Diane, is involved in an accident at work, and is placed on disability. During disability, Dave cannot afford to maintain an existing lease of a Mercedes-Benz®, a Tier 3 vehicle. To avoid having to default on the lease, Dave is able to adjust the existing lease by moving to Tier 1 vehicle, such as a Ford® Fiesta®. Depending on the lease terms, Dave may be considered to have terminated the existing lease early and originated a new lease with the Ford®. Alternatively, Dave may be adjusting the existing lease terms of price (by way of the selected vehicle tier), but maintaining the previously established lease period.

Alternatively, instead of changing the vehicle tier, Dave may be allowed to reduce or remove products from the pricing package. For example, by reducing the amount of insurance coverage, thereby reducing the cost of insurance, Dave may be able to continue to use a Tier 3 vehicle. Such changes may be temporary (e.g., during the time that Dave is on disability) or permanent (e.g., until the end of the lease term or until Dave requests another change to the lease).

Another life event that involves the lessee is when a dependent is added to an auto insurance policy. This is also a life event for the dependent, but for the purposes of the lease, the event is pertinent to the lessee. The lease may provide options for this type of event. For example, the lease may be drawn up to allow a lessee to adjust the products in a lease package (e.g., remove maintenance) or adjust a vehicle tier (e.g., obtain a vehicle at a lower tier) in order to maintain approximately the same cost as before the new driver is added. Another option is to front load the lease so that the payment and vehicle tier do not change when the new driver is added. In effect, the lessee may "overpay" for a duration of a lease with the knowledge that after a child is added to the insurance policy, the overpayment will account for some of the increase due to the added participant, resulting in a flat payment over time. Another option is to adjust the lease based on new costs. In this case, when a new driver is added, the package cost may increase, and the lessee is committed to the new package cost to maintain the same level of service as before the driver was added. In this situation, a reminder may be provided to the lessee from the comprehensive financial institution 100.

Some leases may allow a lessee to change lease terms during the lease on a voluntarily basis, that is without having experienced a life event. For example, the lessee may exchange one car in a tier for another car in the same tier. Depending on the terms of the lease, this may be performed at any time during the lease, but may be constrained by occurrences or timing (e.g., only once a year, or only for a maximum of two times during the term of the lease). Other lease modifications may be available to the lessee at will, such as changing the vehicle tier of the lease or modifying the products accompanying the lease.

In an example situation, a lessee may be involved in an insurable loss incident (e.g., an accident, theft, or vandalism). The comprehensive financial institution may provide benefits to such a lessee by offering to replace the damaged or stolen vehicle with another vehicle from the appropriate tier. The lessee may be directed to a local automobile dealer to take possession of a replacement vehicle. Similar services may be offered to lessees in other situations, for example, when a vehicle breaks down or otherwise malfunctions during operation, when the vehicle runs out of gas, or other situations when a vehicle is inoperable or unavailable.

A lessee may have a financial account with the comprehensive financial institution. For example, the lessee may have a checking account, savings account, retirement account, or a brokerage account with the comprehensive financial institution. At some point, the comprehensive financial institution may provide a recommendation to modify the lease based on information related to one or more accounts. For example, during an annual retirement review, the comprehensive financial institution may suggest or recommend the lessee seek to reduce costs in the lease based on a retirement strategy. The comprehensive financial institution may suggest or recommend changing a vehicle tier, reducing the amount of insurance coverage, or reducing or eliminating a maintenance contract, as examples. As another example, the comprehensive financial institution may monitor a savings account balance, and based on a reduced balance, provide similar recommendations to the lessee. As yet another example, based on a brokerage account balance or forecasted earnings, the comprehensive financial institution may market or advertise a vehicle lease upgrade, such as by upgrading the vehicle in a particular tier, upgrading a vehicle tier, or increasing the amount of insurance coverage.

Lease Termination

At termination of the lease, the lessee may be presented with options similar to those found with conventional leases, such as a purchase option, a renewal option, or a final termination option.

Example Networked System

Figure 2:
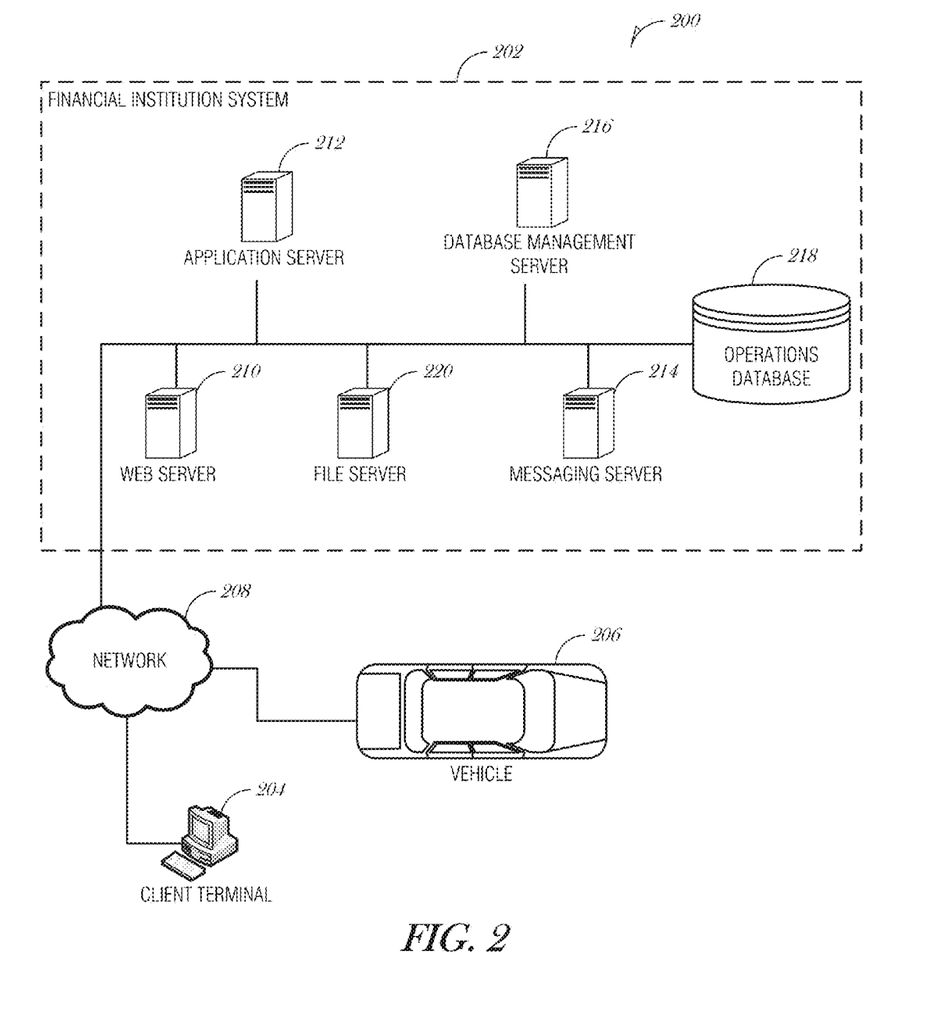
FIG. 2 is a schematic view of a computer network system according to various embodiments.

FIG. 2 is a schematic view of a computer network system 200 according to various embodiments. The computer network system 200 includes financial institution system 202, a client terminal 204, and a vehicle 206, communicatively coupled via a network 208. In an embodiment, the financial institution system 202 includes a web server 210, an application server 212, a messaging server 214, a database management server 216, which is used to manage at least an operations database 218, and a file server 220. The financial institution system 202 may be implemented as a distributed system; for example, one or more elements of the financial institution system 202 may be located across a wide-area network from other elements of the financial institution system 202. As another example, a server (e.g., web server 210, file server 220, or database management server 216) may represent a group of two or more servers, cooperating with each other, provided by way of a pooled, distributed, or redundant computing model.

The network 208 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 208 may include a single local area network (LAN) or wide-area network (WAN), or combinations of LANs or WANs, such as the Internet. The various devices coupled to the network 208 may be coupled to the network 208 via one or more wired or wireless connections.

The web server 210 may communicate with the file server 220 to publish or serve files stored on the file server 220. The web server 210 may also communicate or interface with the application server 212 to enable web-based presentation of information. For example, the application server 212 may consist of scripts, applications, or library files that provide primary or auxiliary functionality to the web server 210 (e.g., multimedia, file transfer, or dynamic interface functions). In addition, the application server 212 may also provide some or the entire interface for the web server 210 to communicate with one or more of the other servers in the financial institution system 202, e.g., the messaging server 214 or the database management server 216. The web server 210, either alone or in conjunction with one or more other computers in the financial institution system 202, may provide a user-interface. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

In an embodiment, the client terminal 204 may include a client program to interface with the financial institution system 202. The client program may include commercial software, custom software, open source software, freeware, shareware, or other types of software packages. In an embodiment, the client program includes a thin client designed to provide query and data manipulation tools for a user of the client terminal 204. The client program may interact with a server program hosted by, for example, the application server 212. Additionally, the client program may interface with the database management server 216.

The operations database 218 may be composed of one or more logical or physical databases. For example, the operations database 218 may be viewed as a system of databases that when viewed as a compilation, represent an "operations database." Sub-databases in such a configuration may include a product database, a customer database, a sales database, a marketing database, a business rules database, a reviews database, an insurance claims database, and the like. The operations database 218 may be implemented as a relational database, a centralized database, a distributed database, an object-oriented database, or a flat database in various embodiments.

In an example use of the financial institution system 202, a person may communicate with the financial institution system 202 to inquire about or obtain a vehicle lease. For example, a user at the client terminal 204 may interact with the financial institution system 202 via the network 208. The person may establish a lease for a vehicle 206 and then receive the vehicle 206 for use during the lease.

The lessee may obtain one or more other products or services from the financial institution system 202. For example, the lessee may obtain vehicle insurance, a maintenance plan, or a full service plan in addition to the lease.

During the term of the lease, the financial institution system 202 may obtain information from the lessee, such as via the client terminal 204. In addition, the financial institution system 202 may obtain information from the vehicle 206, for example, by way of an onboard vehicle telematics system. The financial institution system 202 may analyze gathered information for various reasons, such as to ensure that the lessee is using the vehicle 206 in conformance to terms of the lease, provide reminders for service or maintenance, or adjust insurance rates or coverage based on vehicle telematics.

Example Methods

Figure 3:
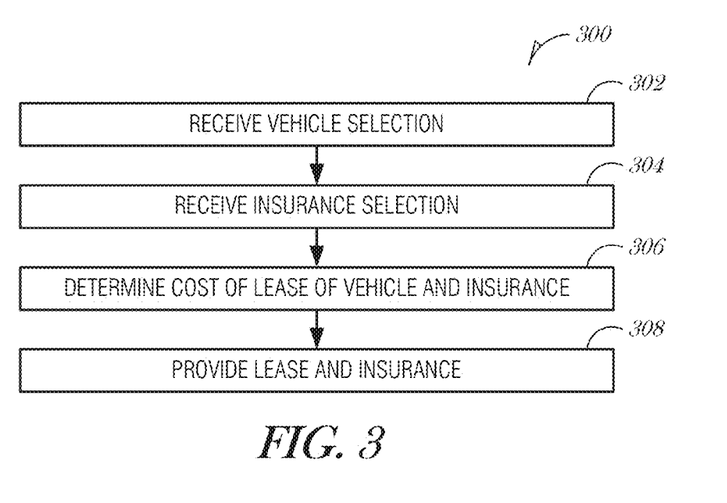
FIG. 3 is a flowchart illustrating a method of managing a vehicle lease according to an example embodiment.

FIG. 3 is a flowchart illustrating a method 300 of managing a vehicle lease according to an example embodiment. In some embodiments, a user is able to obtain or manage a lease from a computer, such as the client terminal 204 (FIG. 2), via an online system provided by a lessor (e.g., the financial institution system 202 of FIG. 2). Accordingly, at 302, a vehicle selected from a plurality of vehicles presented in a user interface is received via the user interface. The user interface may be presented on a device, such as a laptop computer, desktop computer, mobile device, or the like.

In an embodiment, the plurality of vehicles is offered in a plurality of vehicle tiers. Vehicles may be grouped according to tiers. Tiers may be named or labeled for easier reference. For example, tiers may be named generically, such as "Tier 1," "Tier 2," etc., or more descriptively, such as "economy class," "midsize sedan," or "luxury class." Within a tier, vehicles may be grouped according to one or more vehicle characteristics including but not limited to, vehicle MSRP, passenger capacity, government classification, make, model, year, country of manufacture or source country, estimated mileage, or other vehicle characteristics.

At 304, a selected vehicle insurance for the vehicle is received. Insurance offerings may be bundled and labeled to make browsing and shopping easier. For example, insurance packages may be bundled and labeled as "minimum insurance," "moderate coverage," or "full coverage." A recommended insurance bundle may be presented to the user based on information provided by the user or previously obtained from the user.

In an embodiment, the vehicle insurance is offered in a plurality of insurance tiers. Similar to the vehicle tiers, insurance may be designed and sorted into several tiers. Insurance tiers may correlate to the amount of coverage being offered in a particular tier. Insurance tiers may also correlate to the estimated premium or cost. Insurance tiers may also be designed using an insured's characteristics, for example, insurance tiers for younger drivers, mature drivers, and senior drivers.

At 306, a total for a cost for a lease of the vehicle and vehicle insurance associated with the selected vehicle is determined. The cost for the lease and the insurance may be discounted to take into account the fact that the lessee is bundling insurance and a vehicle lease from a single provider.

At 308, the lease of the vehicle and the corresponding vehicle insurance is provided. In an embodiment, the lease and the corresponding insurance is provided by the lessor. In other words, the insurer acts as a lessor and provides the insurance product, related insurance services (e.g., claims processing), and lease services.

In a further embodiment, a vehicle maintenance selection for the vehicle is received. Similar to the vehicle tiers and the insurance tiers, the maintenance offerings may be presented using a plurality of tiers. Maintenance tiers may be based on various factors including cost, coverage, term, and the like. In an embodiment, determining the cost comprises determining the total of the cost for a combination of the lease, the vehicle insurance, and the selected vehicle maintenance.

In an embodiment, the plurality of vehicles are offered in a plurality of vehicle lease tiers, and the vehicle insurance is offered in a plurality of insurance tiers, and determining the cost is based on a selection of a vehicle tier and a selection of an insurance tier.

Figure 4:
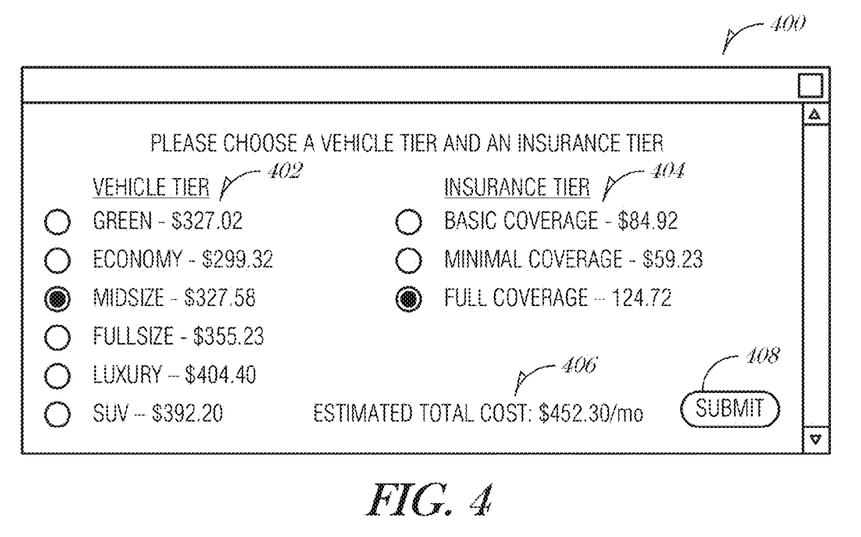
FIG. 4 is a schematic diagram of a user-interface according to an example embodiment.

FIG. 4 is a schematic diagram of a user interface 400 according to an example embodiment. A user may select a vehicle tier 402, which may include labeled tiers, such as "Green" for fuel-efficient vehicles that use alternative fuel or are environmentally friendly; "Economy" for generally fuel-efficient vehicles with two or four doors and smaller passenger and storage capacity; "Midsize" for vehicles with larger passenger and storage capacity than those found in the "Economy" tier; "Fullsize" for vehicles with even larger passenger and storage capacity than those found in "Midsize"; "Luxury" for vehicles that include premium features, such as leather seating, larger engines, or other features limited to exclusive vehicles; and "SUV" for sports utility vehicles, which includes vans, trucks, sports trucks, and other larger vehicles. It is understood that other vehicle tiers may be presented or that the ones depicted may be omitted.

In an embodiment, the vehicle tiers presented to a user are based on an analysis of the user's characteristics, which may be indicative of the user's family situation, financial situation, or other personal situation. For example, a user known to be experiencing financial difficulties (e.g., job loss) may not be presented higher-cost alternatives (e.g., the "Luxury" tier). In addition to or in the alternative, the user interface 400 may provide an indication of a recommended vehicle tier. Along with the recommendation, an explanation may be provided in the user interface 400. The explanation may guide the user to a better choice for the current situation the user is experiencing.

In addition to a vehicle tier 402, one or more insurance tiers 404 are presented from which to select. In the example depicted in FIG. 4, three insurance tiers 404 are illustrated. A "Basic Coverage" tier may provide the typical, average, or popular insurance products. A "Minimal Coverage" tier may provide the minimal coverage for a jurisdiction. The "Minimal Coverage" tier may be automatically configured based on the user's personal information. The "Full Coverage" insurance tier may provide a broad array of coverage for various insurance risks. In addition, the "Full Coverage" tier may provide higher amounts of coverage, lower deductibles, or broader coverage when compared to the insurance products in the "Basic Coverage" or "Minimal Coverage" tiers.

Also illustrated in FIG. 4 are estimated costs for each selectable tier. This provides a user a basic understanding of the potential total cost. In the example illustrated, the costs are estimates because the user has not provided enough information for a full quote. In an embodiment, as a user changes selections of a vehicle tier 402, the costs in the insurance tiers 404 are adjusted to reflect the estimated insurance costs of the newly selected vehicle tier. An estimated total cost 406 is provided in the user interface 400. In an embodiment, the estimated total cost is presented with a disclaimer that the total cost is merely an estimate.

Once the user selects a vehicle tier 402 and an insurance tier 404 of their liking, the user may submit the selections using the submit control 408.

Figure 5:
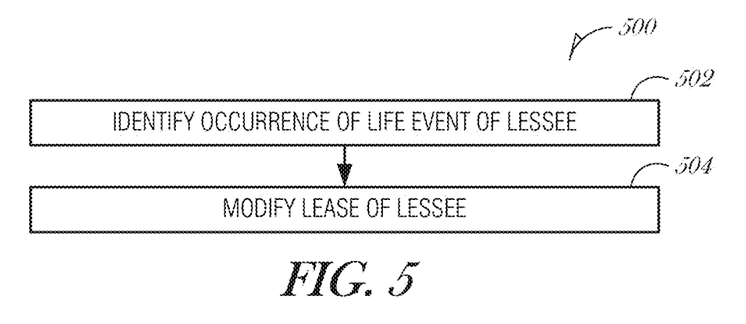
FIGS. 5 and 6 are flowcharts illustrating methods of managing a vehicle lease according to various example embodiments.

FIG. 5 is a flow chart illustrating a method 500 of managing a vehicle lease according to an example embodiment. At 502, a life event occurrence of a lessee of the vehicle lease is identified. The life event occurrence may be identified by a computing system or device. In various embodiments, the life event is one of: a change in family status, a change in marital status, a change in job status, or a change in financial status. For example, a comprehensive financial institution may receive notice from an insured that the insured was recently married. This life event may invoke several workflows, such as a query as to whether the insured wants to change the beneficiary of a life insurance policy, or a workflow to inquire about drafting a will, or a workflow for changing the beneficiary for a retirement account managed by the comprehensive financial institution. In addition to these types of workflows, another workflow may be to modify an existing vehicle lease. For example, the lessee may be leasing a two-door sports car. The financial institution may have information, such as through its insurance division, that the two-door sports car is the only car the lessee owns. The addition of at least one more in the family may result in a two-door sports car as not being the appropriate choice for the lessee. In another embodiment, the financial institution may recommend the origination of a new vehicle lease after receiving an indication of a life event.

At 504, the vehicle lease is modified. Continuing the example from above, the vehicle lease may be modified by changing the vehicle in the lease. The two-door sports car may be in the premium tier, and the lessee may be given the opportunity to choose another vehicle from the same tier.

In a further embodiment, modifying the vehicle lease comprises presenting the lessee with an option to alter a vehicle tier, receiving an altered vehicle tier, and provisioning a vehicle according to the altered vehicle tier. For example, a life event that impacts a person's financial stability may be used as a triggering event to analyze and then recommend a change in one or more aspects of a vehicle lease, such as a vehicle tier, an insurance tier, or a maintenance tier. In one example, the lessee is provided an opportunity to alter a vehicle tier to adjust for a change in lifestyle. In another example embodiment, the lessee may choose to alter a vehicle tier for any reason.

Other modifications may be made to a vehicle lease in response to detecting or identifying a life event of the lessee. Thus, in a further embodiment, modifying the vehicle lease comprises modifying the lease term. In an embodiment, modifying the lease comprises terminating the vehicle lease.

In a further embodiment, the lease is packaged as a lease package with at least one additional product or service component in addition to the vehicle lease, and wherein modifying the lease comprises modifying the lease package by adding, removing, or modifying a component of the lease package. Such changes may include actions such as increasing, decreasing, adding, or removing insurance coverage; increasing, decreasing, adding, or removing maintenance and repair coverage; or changing vehicle tiers or exchanging a vehicle within a tier.

In a further embodiment, the life event is a dependent child obtaining a driver's license, and wherein the component of the lease package is a vehicle insurance policy, and wherein modifying the lease comprises adding the dependent child to the vehicle insurance policy. In the case where the life event is somewhat predictable, such as when a minor dependent will be able to obtain a license, the lease costs may be adjusted to provide a consistent cost to the lessee over time. For example, to offset the increase in insurance cost at the time the new driver is added to the insurance policy, the lease fees may be frontloaded, thereby providing a flat, or near flat, cost to the lessee during the lease period. In another example, the lease fees are adjusted once changes are made to the lease.

Figure 6:
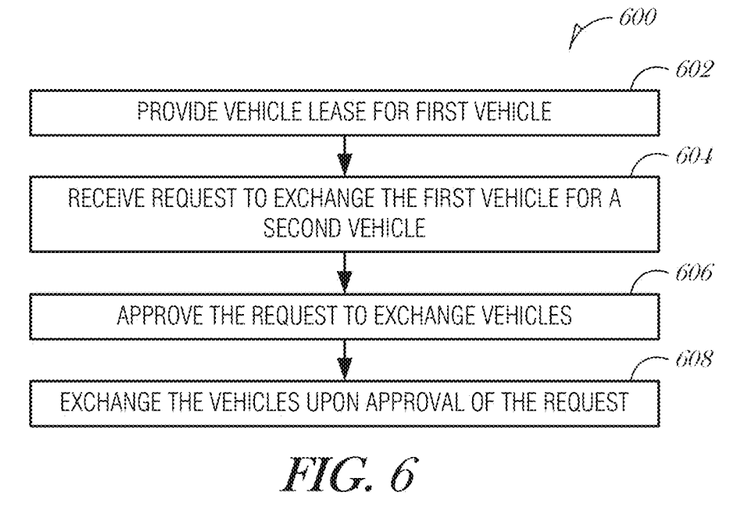

FIG. 6 is a flow chart illustrating a method 600 of managing a vehicle lease according to an example embodiment. At 602, a vehicle lease is provided to a lessee, the vehicle lease being for a vehicle in a first vehicle tier offered by the lessor.

At 604, a request to exchange the vehicle for a second vehicle in a second vehicle tier is received. The request may be received by a computing system or device. The request may be in response to an event, such as an insurance claim. For example, when a lessee is in an accident and the vehicle is considered less than a total loss (i.e., repairable), the lessee may be provided the opportunity to exchange the repaired or repairable vehicle for a different vehicle.

The vehicle exchange may be within a tier or between two tiers. Thus, in an embodiment, the first vehicle tier is the same as the second vehicle tier. In another embodiment, the first vehicle tier is not the same as the second vehicle tier.

At 606, the request to exchange the vehicle is approved. Approval may depend on several factors, such as whether the lessee is in good standing, whether the vehicle being exchanged is in appropriate condition or under a certain mileage, or whether the lease terms provide for the exchange.

At 608, upon approval of the request to exchange, the vehicle is exchanged for the second vehicle. Vehicle exchange may be performed at an automobile dealer. This provides convenience to the lessee and may provide benefits to the auto dealer and financial institution as well.

In a further embodiment, approving the request comprises determining an allowable number of times the lessee can exchange vehicles, and if the request to exchange the vehicle is less than or equal to the allowable number of times the lessee can exchange vehicles, then approving the request to exchange the vehicle. The number of allowable times may be a negotiable contract term in the lease. For example, a lessee may choose to increase the number of allowable times that a vehicle may be exchanged. This choice may increase the cost of the lease. As another example, an exchange may be considered an ancillary service and each time the lessee exchanges a vehicle, a cost is assessed and billed to the lessee outside of the regular lease payments.

In a further embodiment, determining the allowable number of times comprises determining an allowable number of times the lessee can exchange vehicles in a particular time period, and wherein approving the request comprises approving the request when the request to exchange the vehicle is less than or equal to the allowable number of times the lessee can exchange vehicles for the particular time period.

Hardware and Software Platform

Figure 7:
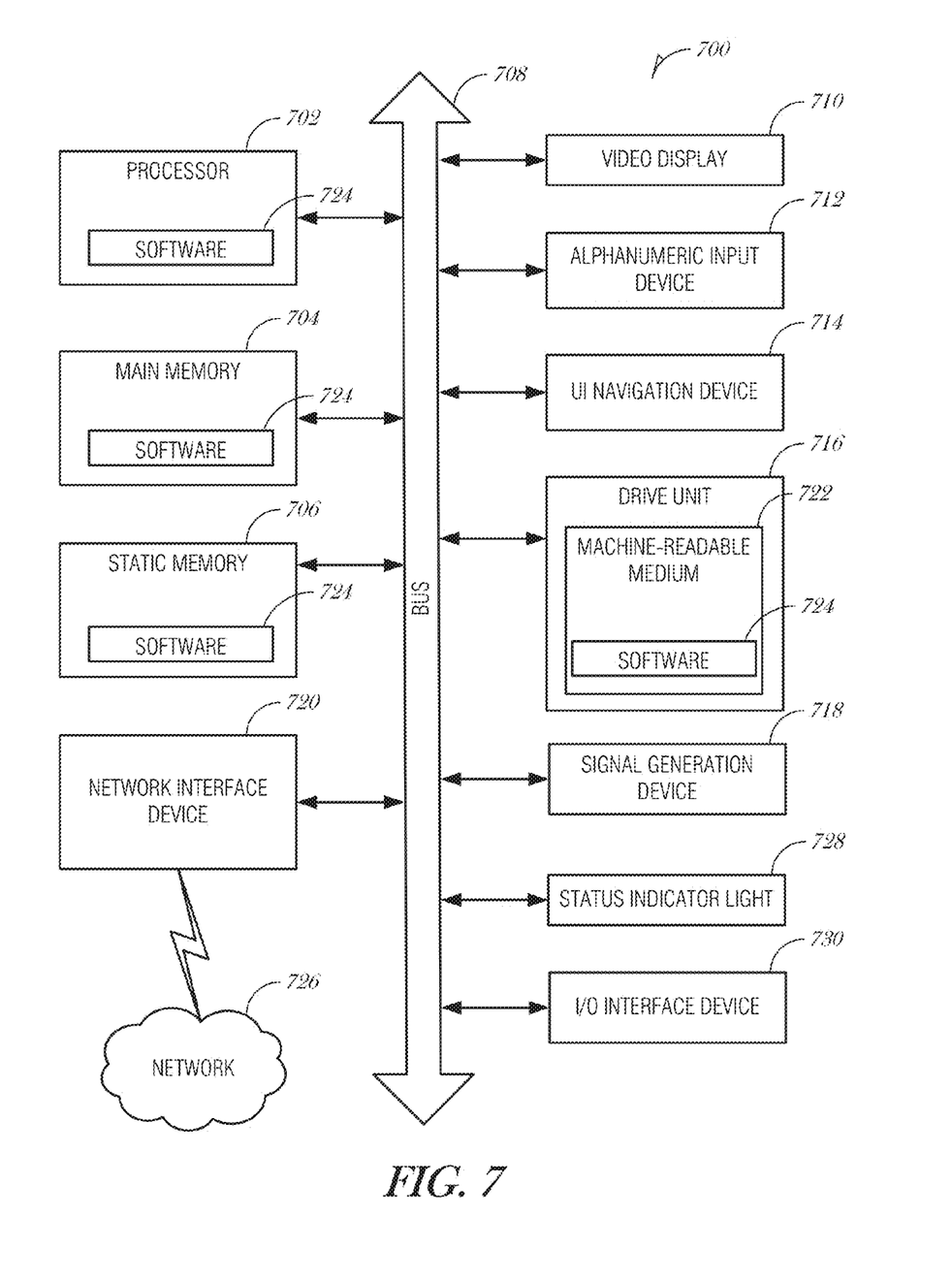
FIG. 7 is a block diagram illustrating a machine in the example form of a computer system, within which a set or sequence of instructions for causing the machine to perform any one of the methodologies discussed herein may be executed, according to various embodiments.

FIG. 7 is a block diagram illustrating a machine in the example form of a computer system 700, within which a set or sequence of instructions for causing the machine to perform any one of the methodologies discussed herein may be executed, according to various embodiments. In various embodiments, the machine may comprise a computer, a network router, a network switch, a network bridge, Personal Digital Assistant (PDA), a cellular telephone, a web appliance, a kiosk, set-top box (STB) or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processor 702 (e.g., a central processing unit (CPU)), a main memory 704 and a static memory 706, which communicate via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720 to interface the computer system 700 to a network 726.

The disk drive unit 716 includes a machine-readable medium 722 on which is stored a set of instructions or software 724 embodying any one, or all, of the methodologies described herein. The software 724 is also shown to reside, completely or at least partially, within the main memory 704 and/or within the processor 702 and/or static memory 706. The software 724 may further be transmitted or received via the network interface device 720.

While the computer system 700 is shown with a processor 702, it is understood that the systems and methods described herein may be implemented on one or more processors on one or more computer systems, including but not limited to a multi-processor computer (e.g., two or more separate processors or two or more cores in a single processor), a multi-computer system (e.g., a distributed computing environment), or a mixture of single-processor and multi-processor computers in a distributed fashion.

For the purposes of this specification, the term "machine-readable medium" or "computer-readable medium" shall be taken to include any tangible non-transitory medium which is capable of storing or encoding a sequence of instructions for execution by the machine and that cause the machine to perform any one of the methodologies described herein. The terms "machine-readable medium" or "computer-readable medium" shall accordingly be taken to include, but not be limited to, solid-state memories, and optical or magnetic disks. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. For example, one module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The description includes references to the accompanying drawings, which form a part of the Detailed Description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

As used throughout this application, the word "may" is used in a permissive sense (e.g., meaning having the potential to), rather than the mandatory sense (e.g., meaning "must"). Similarly, the words "include", "including", and "includes" mean including but not limited to. To facilitate understanding, like reference numerals have been used, where possible, to designate like elements common to the figures.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method for managing a vehicle lease, the method comprising:
   identifying by a computing system with a processor that a life event has occurred for a lessee of the vehicle lease;
   modifying, via the processor, the vehicle lease;
   wherein the vehicle lease is packaged as a lease package with at least one additional product or service component in addition to the vehicle lease, the method further comprising: modifying the lease package by adding, removing, or modifying a component of the lease package; and
   wherein the life event is a dependent child obtaining a driver's license, and wherein a component of the at least one additional product or service component of the lease package is a vehicle insurance policy, and wherein modifying the vehicle lease comprises adding the dependent child to the vehicle insurance policy.

2. The method of claim 1, wherein modifying the vehicle lease comprises:
   presenting the lessee with an option to alter a vehicle tier;
   receiving an altered vehicle tier; and
   provisioning a vehicle according to the altered vehicle tier.

3. The method of claim 1, wherein modifying the vehicle lease comprises modifying a lease term.

4. The method of claim 3, wherein modifying the vehicle lease comprises terminating the vehicle lease.

5. A method of managing a vehicle lease, the vehicle lease offered by a lessor to a lessee, the method comprising:
   providing the vehicle lease to the lessee, the vehicle lease being for a vehicle in a first vehicle tier offered by the lessor;
   receiving, at a computing system with a processor, a request to exchange the vehicle for a second vehicle in a second vehicle tier;
   approving, via the processor, the request to exchange the vehicle;
   upon approval of the request to exchange, exchanging the vehicle for the second vehicle;
   wherein approving the request comprises: determining an allowable number of times the lessee can exchange vehicles; and if the request to exchange the vehicle is less than or equal to the allowable number of times the lessee can exchange vehicles, then approving the request to exchange the vehicle; and
   wherein determining the allowable number of times comprises determining an allowable number of times the lessee can exchange vehicles in a particular time period, and wherein approving the request comprises approving the request when the request to exchange the vehicle is less than or equal to the allowable number of times the lessee can exchange vehicles for the particular time period.

6. The method of claim 5, wherein the first vehicle tier is the same as the second vehicle tier.

7. The method of claim 5, wherein the first vehicle tier is not the same as the second vehicle tier.

* * * * *